(12) United States Patent
Carlson

(10) Patent No.: US 7,900,754 B2
(45) Date of Patent: Mar. 8, 2011

(54) ROTATING TUB WASHER BINARY DAMPER SYSTEM

(75) Inventor: J. David Carlson, Cary, NC (US)

(73) Assignee: Lord Corporation, Cary, NC (US)

( * ) Notice: Subject to any disclaimer, the term of this patent is extended or adjusted under 35 U.S.C. 154(b) by 390 days.

(21) Appl. No.: 11/089,124

(22) Filed: Mar. 24, 2005

(65) Prior Publication Data

US 2005/0211517 A1    Sep. 29, 2005

Related U.S. Application Data

(60) Provisional application No. 60/637,898, filed on Dec. 21, 2004, provisional application No. 60/556,257, filed on Mar. 25, 2004.

(51) Int. Cl.
    *F16F 15/03*    (2006.01)
(52) U.S. Cl. ............ 188/267; 188/266; 188/266.1; 188/266.2; 188/267.1; 188/267.2
(58) Field of Classification Search ............ 188/266.1, 188/266.2, 266.3, 271, 300
    See application file for complete search history.

(56) References Cited

U.S. PATENT DOCUMENTS

| | | | |
|---|---|---|---|
| 5,018,606 A | | 5/1991 | Carlson |
| 6,053,291 A | * | 4/2000 | Shibahata et al. ............ 188/271 |
| 6,378,671 B1 | * | 4/2002 | Carlson ............ 188/267.2 |
| 6,640,940 B2 | * | 11/2003 | Carlson ............ 188/267.2 |
| 6,910,558 B2 | * | 6/2005 | Wang et al. ............ 188/300 |
| 6,920,966 B2 | * | 7/2005 | Buchele et al. ............ 188/300 |
| 6,955,248 B2 | * | 10/2005 | Park et al. ............ 188/267 |
| 2003/0217901 A1 | * | 11/2003 | Carlson ............ 188/267 |
| 2004/0231373 A1 | * | 11/2004 | Kim et al. ............ 68/23.1 |
| 2006/0144657 A1 | * | 7/2006 | Carlson ............ 188/271 |

FOREIGN PATENT DOCUMENTS

| | | |
|---|---|---|
| EP | 1455011 A1 | 8/2004 |
| EP | 1479812 A1 | 11/2004 |

* cited by examiner

*Primary Examiner* — Bradley T King
*Assistant Examiner* — James K Hsiao
(74) *Attorney, Agent, or Firm* — Edward F. Murphy

(57) ABSTRACT

The invention provides a rotating tub washer with an on-off binary damper system for damping a problematic movement between the washer frame and the rotating tub. The on-off binary damper system has a friction pad and a housing friction damper surface, with the friction pad in contact with said housing friction damper surface. The on-off binary damper system has an electromagnetic coil core and a magnetic locking slide with a slide gap between said electromagnetic coil core and said magnetic locking slide to provide for relative sliding motion between the electromagnetic coil core and the magnetic locking slide, wherein a current supplied to said electromagnetic coil core removes the slide gap and electromagnetically locks the electromagnetic coil core and the magnetic locking slide together with the relative sliding motion transferred to the friction pad, with the friction pad rubbing against said housing friction damper surface inorder to dampen the problematic movement between the frame and the rotating tub.

20 Claims, 18 Drawing Sheets

ROTATING TUB WASHER BINARY DAMPER SYSTEM

This application claims the benefit of, and incorporates by reference, U.S. Provisional Patent Application No. 60/637,898 filed on Dec. 21, 2004. This application claims the benefit of, and incorporates by reference, U.S. Provisional Patent Application No. 60/556,257 filed on Mar. 25, 2004.

FIELD OF THE INVENTION

The present invention relates to rotating tub washers and magnetically actuated motion control devices. In particular the present invention relates to rotating tub washers with magnetically actuated binary damper systems to control motion.

BACKGROUND OF THE INVENTION

Magnetically actuated motion control devices such as magnetically controlled dampers or struts provide motion control, e.g., damping that is controlled by the magnitude of an applied magnetic field. Much of the work in the area of magnetically controlled dampers has focused on either electrorheological (ER) or magnetorheological (MR) dampers. The principle underlying both of these types of damping devices is that particular fluids change viscosity in proportion to an applied electric or magnetic field. Thus, the damping force achievable with the fluid can be controlled by controlling the applied field. Examples of ER and MR dampers are discussed in U.S. Pat. Nos. 5,018,606 and 5,384,330, respectively.

MR fluids have high yield strengths and viscosities, and therefore are capable of generating greater damping forces than ER fluids. In addition, MR fluids are activated by easily produced magnetic fields with simple low voltage electromagnetic coils. As a result, dampers employing MR fluids have become preferred over ER dampers.

Because ER and MR fluid dampers still involve fluid damping, the dampers must be manufactured with precise valving and seals. In particular, such dampers typically require a dynamic seal and a compliant containment member which are not particularly easy to manufacture and assemble. Further, the fluid type dampers can have significant "off-state" forces which can further complicate manufacture and assembly. Off-state forces refer to those forces at work in the damper when the damper is not energized.

There is a need for a damper system and method of economically controlling vibration motion. There is a need for an economically feasible method of controlling vibration motion in rotating tub washers. There is a need for a robust damper system and method of controlling vibration motion in rotating tub washers.

SUMMARY OF THE DISCLOSURE

According to one aspect of the invention, a magnetically actuated binary damper motion control device is provided. The magnetically actuated binary damper motion control device includes a housing, a movable member and an electromagnetic coil core magnetic field generator. A magnetic field applied by the field generator actuates the binary damper system to provide damping.

The invention includes a rotating tub washer. The washer includes a frame, a rotating tub, and a rotating tub washer on-off binary damper system for damping a problematic movement between the frame and the rotating tub. The on-off binary damper system includes a friction pad and a housing friction damper surface with the friction pad in contact with the housing friction damper surface. The on-off binary damper system includes an electromagnetic coil core and a magnetic locking slide, with the electromagnetic coil core disposed proximate the magnetic locking slide with a slide gap between the electromagnetic coil core and the magnetic locking slide to provide for relative sliding motion between the electromagnetic coil core and the magnetic locking slide, wherein a current supplied to the electromagnetic coil core removes the slide gap and electromagnetically locks the electromagnetic coil core and the magnetic locking slide together with the relative sliding motion transferred to the friction pad, with the friction pad rubbing against the housing friction damper surface inorder to dampen the problematic movement between the frame and the rotating tub.

The invention includes an on-off binary damper system for damping a problematic vibration. The on-off binary damper system includes a friction pad and a housing friction damper surface, with the friction pad in contact with the housing friction damper surface. The on-off binary damper system includes an electromagnetic coil core and a magnetic locking slide, with the electromagnetic coil core disposed proximate the magnetic locking slide with a slide gap between the electromagnetic coil core and the magnetic locking slide to provide for relative sliding motion between the electromagnetic coil core and the magnetic locking slide, wherein a current supplied to the electromagnetic coil core removes the slide gap and electromagnetically locks the electromagnetic coil core and the magnetic locking slide together with the relative sliding motion transferred to the friction pad, with the friction pad rubbing against the housing friction damper surface inorder to dampen the problematic vibration.

The invention includes an on-off binary damper system for damping a problematic vibration. The on-off binary damper system includes a damper, an electromagnetic coil core and a magnetic locking slide. The electromagnetic coil core is disposed proximate the magnetic locking slide with a slide gap between the electromagnetic coil core and the magnetic locking slide to provide for relative sliding motion between the electromagnetic coil core and the magnetic locking slide, wherein a current supplied to the electromagnetic coil core removes the slide gap and electromagnetically locks the electromagnetic coil core and the magnetic locking slide together with the relative sliding motion transferred to the damper with the damper damping the problematic vibration.

The invention includes a method of making a damper system for damping a problematic vibration. The method includes providing a damper. The method includes providing a magnetic locking slider, the magnetic locking slider having an electromagnetic coil core and a magnetic locking slide, the electromagnetic coil core disposed proximate the magnetic locking slide with a slide gap between the electromagnetic coil core and the magnetic locking slide to provide for a relative sliding motion between the electromagnetic coil core and the magnetic locking slide. The method includes coupling the damper to the magnetic locking slider wherein a current supplied to the electromagnetic coil core removes the slide gap and electromagnetically locks the electromagnetic coil core and the magnetic locking slide together with the relative sliding motion transferred to the damper with the damper damping the problematic vibration.

The invention includes a method of damping a problematic vibration. The method includes providing a damper and providing a magnetic locking slider. The provided magnetic locking slider having an electromagnetic coil core and a magnetic locking slide, the electromagnetic coil core disposed proximate the magnetic locking slide with a slide gap between the electromagnetic coil core and the magnetic locking slide to provide for a relative sliding motion between the electromagnetic coil core and the magnetic locking slide. The method includes coupling the damper to the magnetic locking slider, and supplying a current to the electromagnetic coil core to remove the slide gap and electromagnetically transfer the sliding motion to the damper with the damper damping the problematic vibration.

The invention includes a method of making a damper system for damping a problematic motion. The method includes providing a damper and providing a separate magnetic locking slider switchable member, the magnetic switchable member separate and disconnected from the damper. The provided magnetic switchable member having an electromagnetic coil core and a magnetic target, the electromagnetic coil core disposed proximate the magnetic target to provide for a relative uncoupled motion between the electromagnetic coil core and the magnetic target. The method includes coupling the damper to the separate switchable member wherein a current supplied to the electromagnetic coil core removes the relative uncoupled motion between the electromagnetic coil core and the magnetic target and electromagnetically transfers the problematic motion to the damper with the damper damping the problematic motion.

The invention includes a method of damping a problematic vibration motion. The method includes providing a damper and providing a magnetic locking slider switchable member, the magnetic switchable member having an electromagnetic coil core and a magnetic target, the electromagnetic coil core disposed proximate the magnetic target with a decoupling gap between the electromagnetic coil core and the magnetic target to provide for a relative uncoupled motion between the electromagnetic coil core and the magnetic target. The magnetic switchable member is provided separate and disconnected from the damper. The method includes coupling the provided damper to the provided separate magnetic switchable member, and supplying a current to the electromagnetic coil core to remove the relative uncoupled motion between the electromagnetic coil core and the magnetic target wherein the relative uncoupled motion is transferred to the damper with the damper damping the problematic motion.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION

Reference will now be made in detail to the present preferred embodiments of the invention, examples of which are illustrated in the accompanying drawings.

The invention includes a rotating tub washer. The washer includes a frame, a rotating tub, and a rotating tub washer on-off binary damper system for damping a problematic movement between the frame and the rotating tub. The on-off binary damper system includes a nonmagnetic lubricated spongy resilient friction pad, preferably a greased foam sponge, and a housing friction damper surface with the friction pad in contact with the housing friction damper surface. The on-off binary damper system includes an electromagnetic coil core and a magnetic locking slide having a plurality of metal slats, with the electromagnetic coil core disposed proximate the magnetic locking slide with a slide gap between the electromagnetic coil core and the magnetic locking slide to provide for undamped relative sliding motion between the electromagnetic coil core and the magnetic locking slide, wherein a current supplied to the electromagnetic coil core removes the slide gap and electromagnetically locks the electromagnetic coil core and the magnetic locking slide together with the relative sliding motion transferred to the friction pad, with the friction pad rubbing against the housing friction damper surface inorder to dampen the problematic movement between the frame and the rotating tub.

Figure 1:
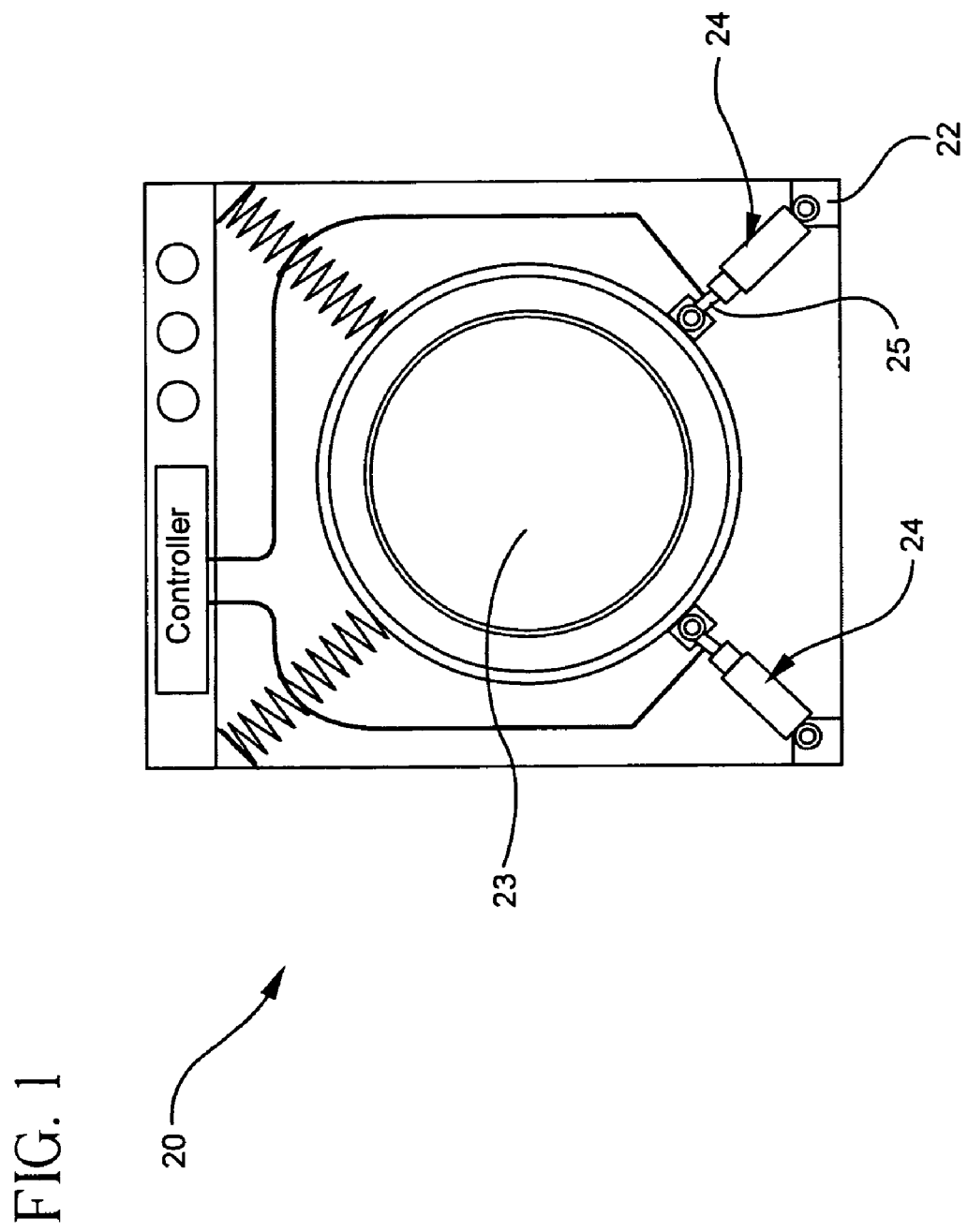
FIG. 1 shows an embodiment of the invention.
Figure 3A:
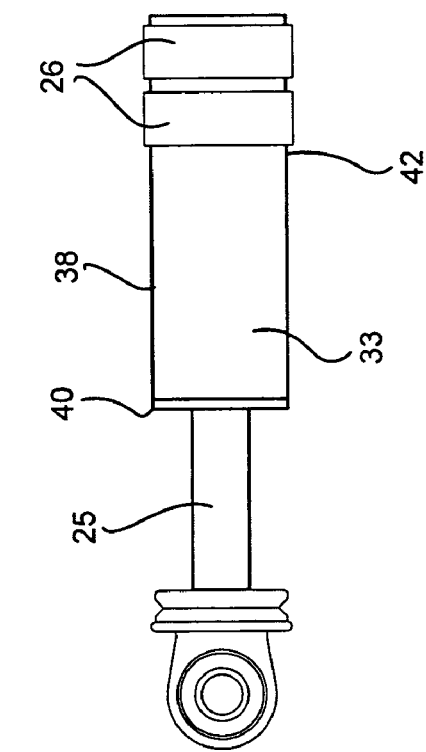
FIGS. 3A-C show embodiments of the invention.
Figure 3B:
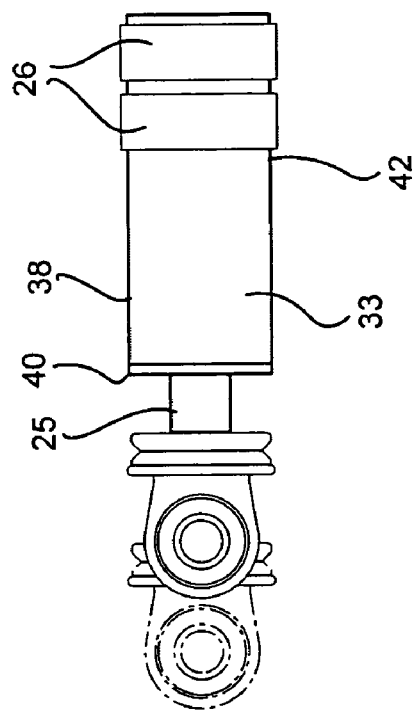
Figure 3C:
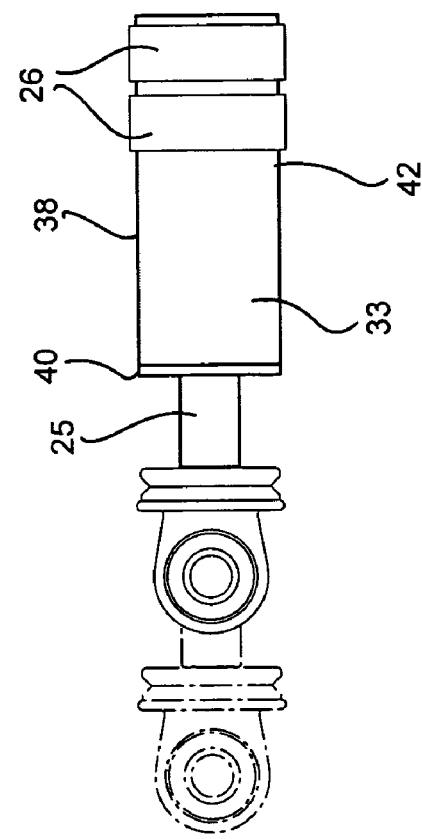
Figure 4B:
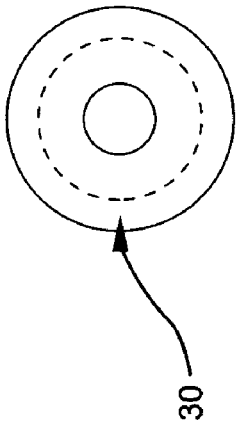
FIGS. 4A-C show embodiments of the invention.
Figure 4C:
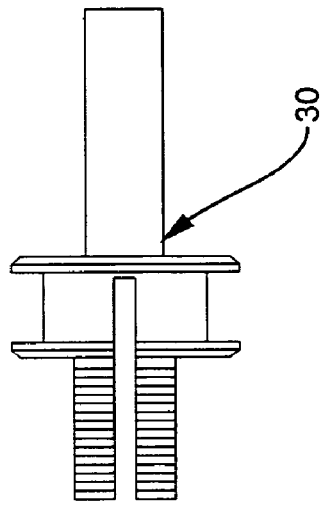
Figure 4A:
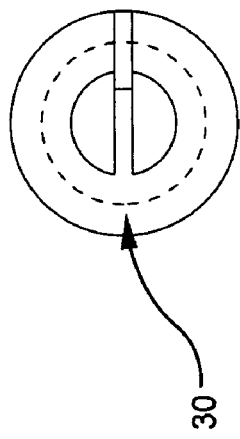
Figure 5B:
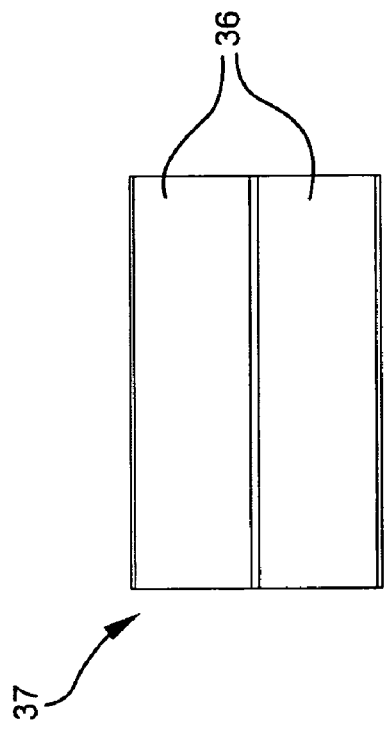
FIGS. 5A-B show embodiments of the invention.
Figure 5A:
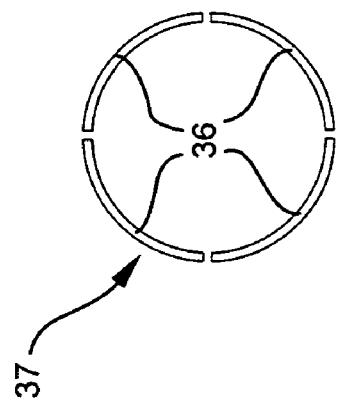
Figure 6:
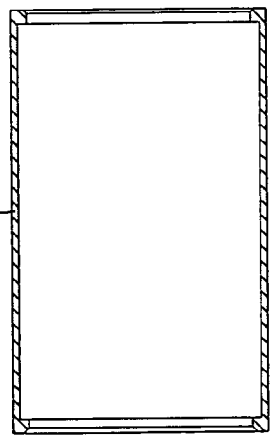
FIG. 6 shows an embodiment of the invention.
Figure 7B:
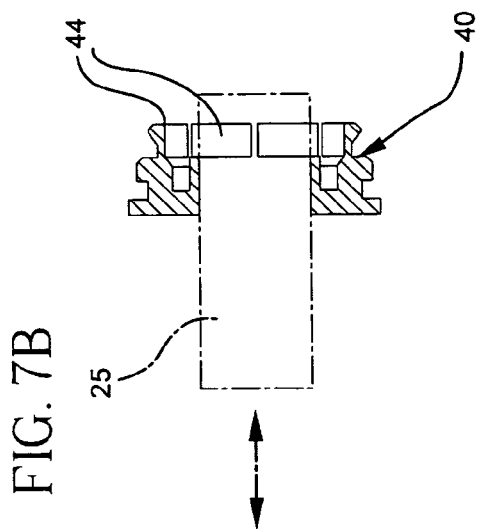
FIGS. 7A-B show embodiments of the invention.
Figure 7A:
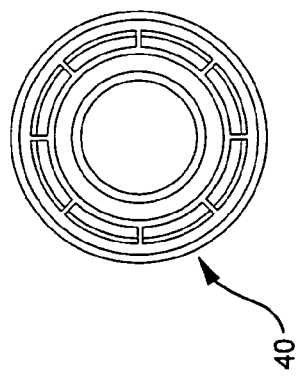
Figure 8A:
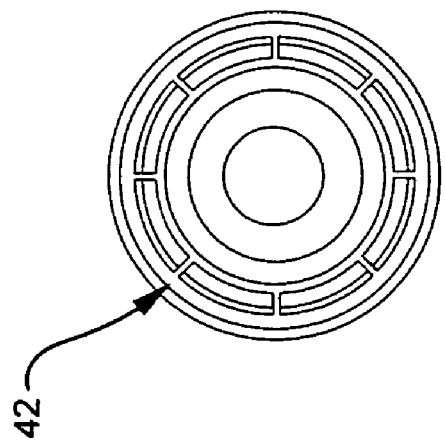
FIGS. 8A-B show embodiments of the invention.
Figure 8B:
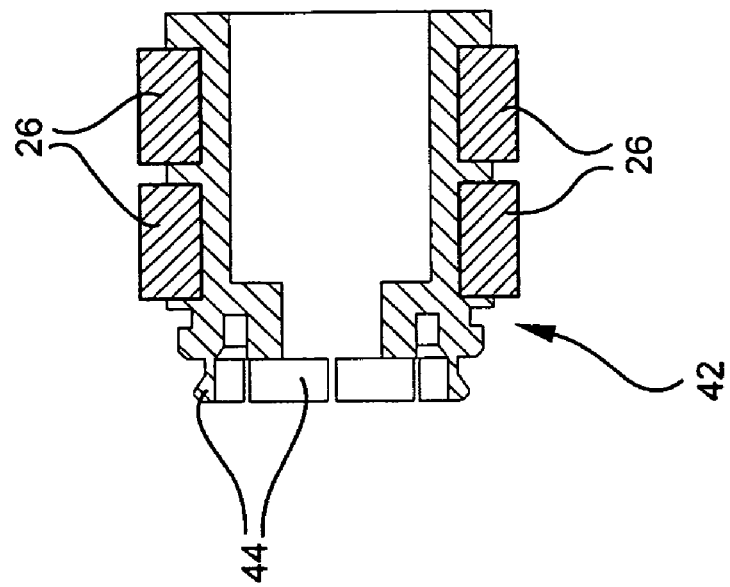
Figure 9B:
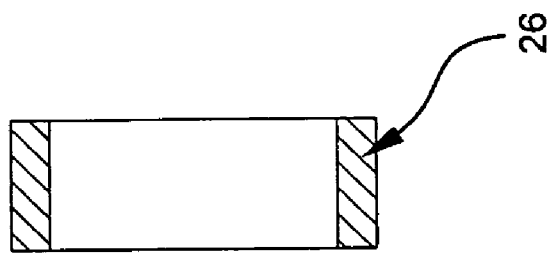
FIGS. 9A-B show embodiments of the invention.
Figure 9A:
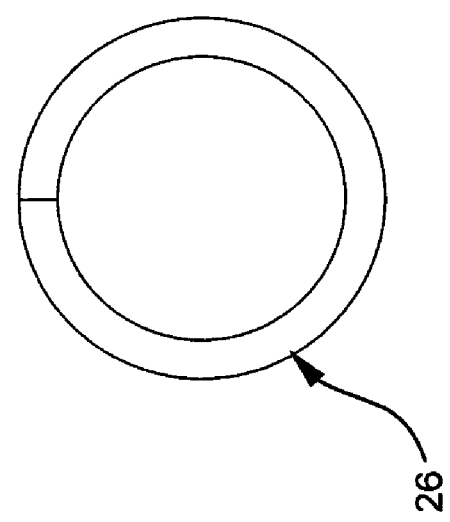
Figure 10A:
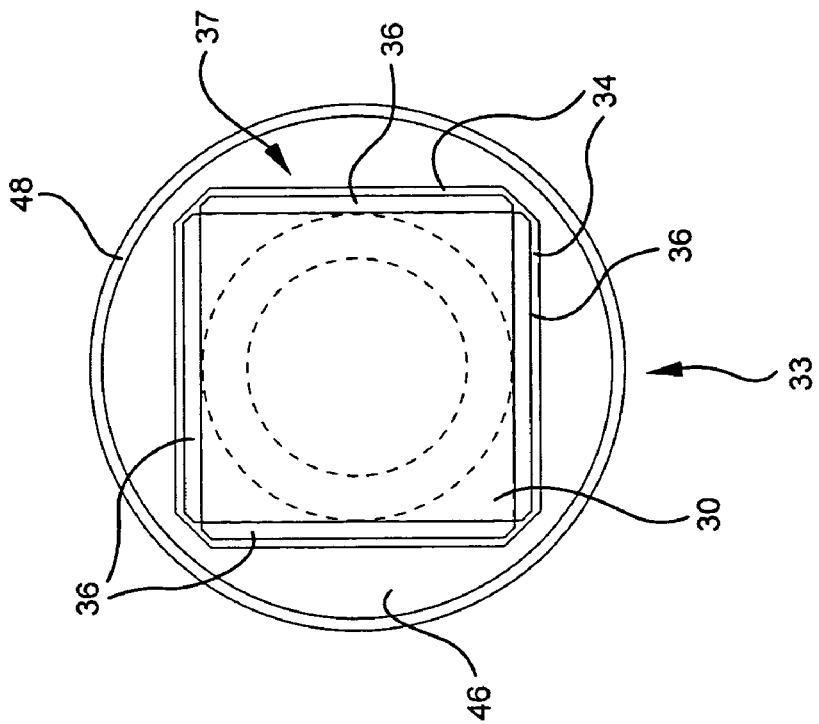
FIGS. 10A-F show embodiments of the invention.
Figure 10B:
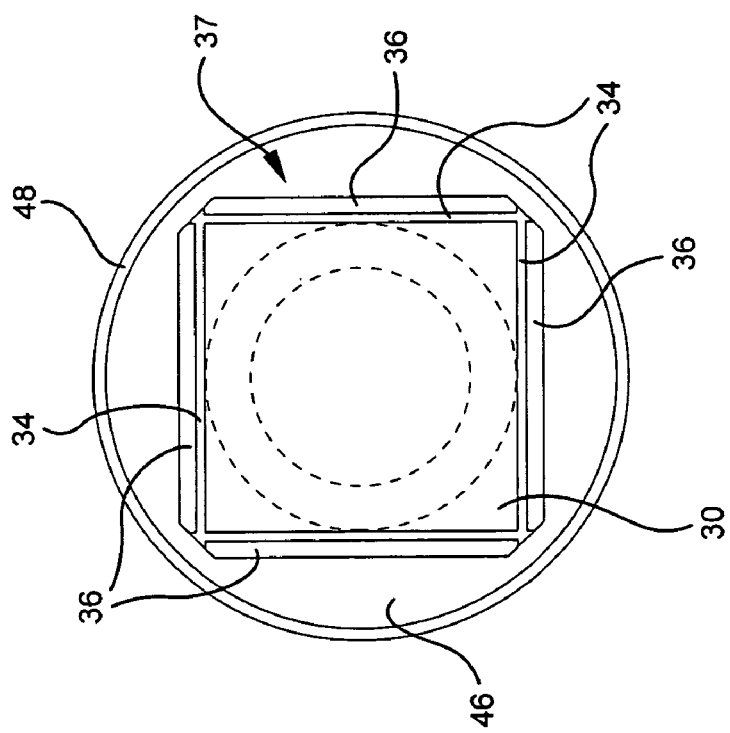
Figure 10D:
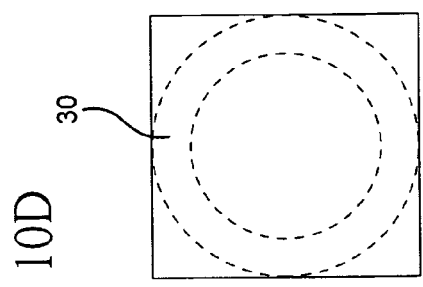
Figure 10F:
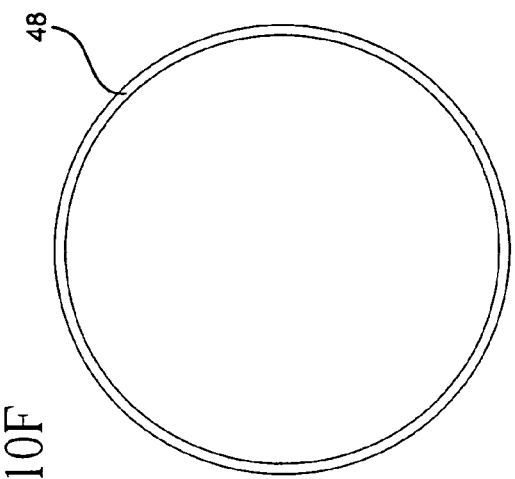
Figure 10C:
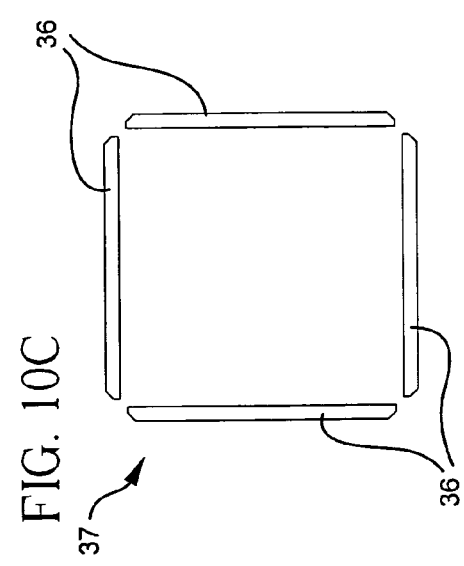
Figure 10E:
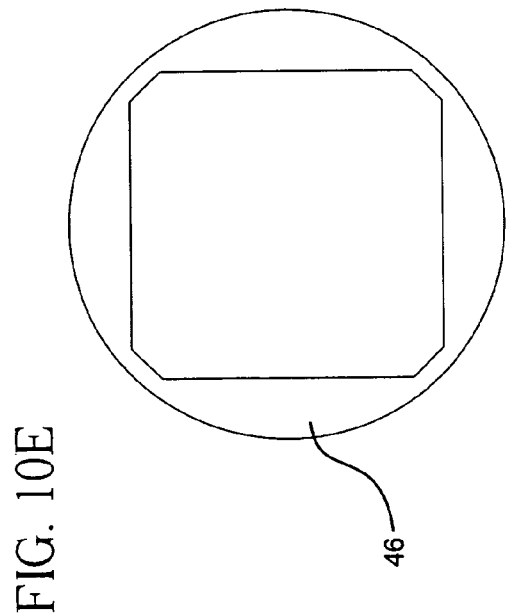
Figure 11:
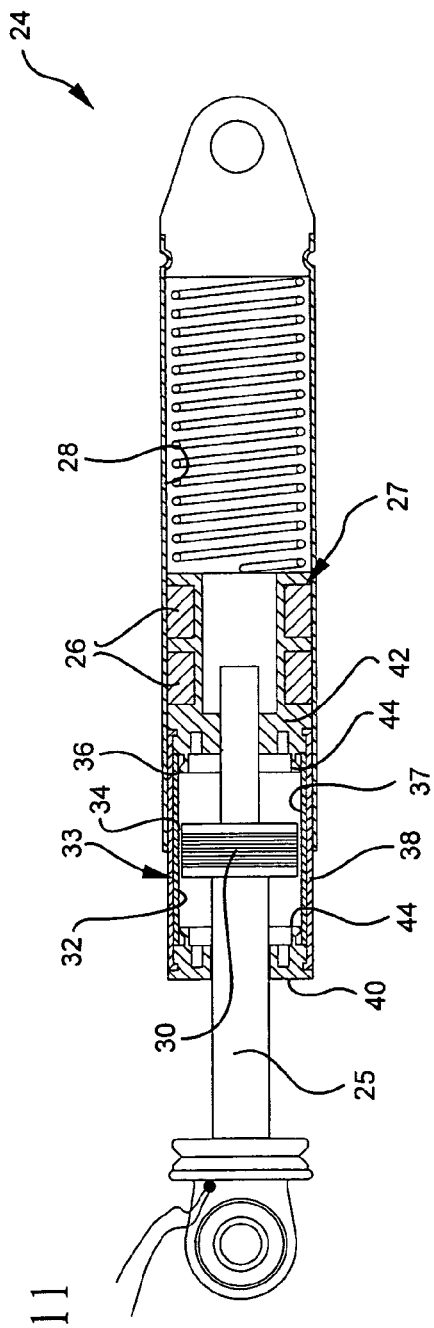
FIG. 11 shows an embodiment of the invention.
Figure 12:
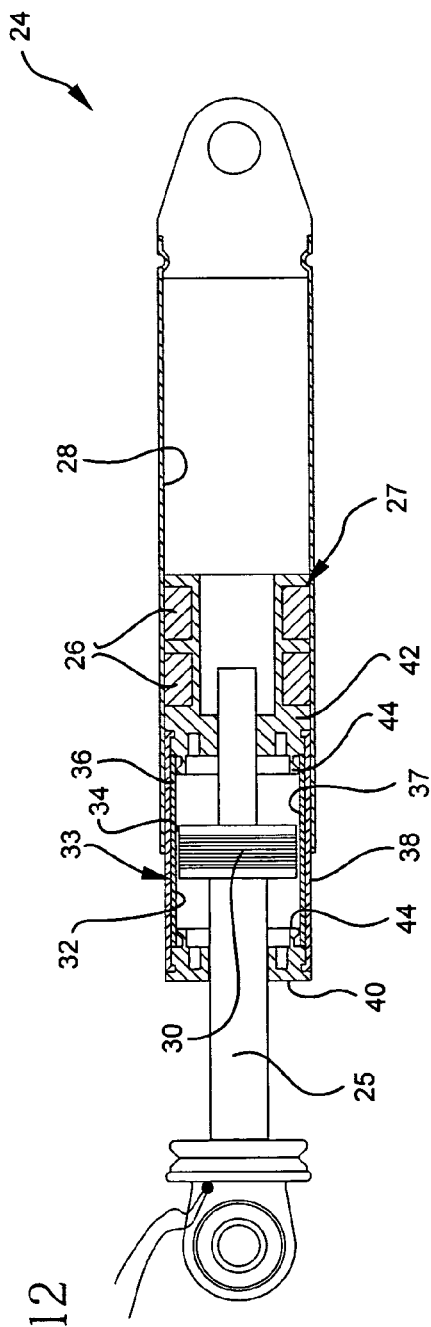
FIG. 12 shows an embodiment of the invention.

FIG. 1 shows a rotating tub washer 20, with a frame 22, a rotating tub 23, and a rotating tub washer on-off binary damper system 24 for damping a problematic movement between said frame and said rotating tub. As, shown in FIG. 2, the on-off binary damper system 24 preferably includes at least one friction pad 26 and a housing friction damper surface 28 with the friction pad 26 in contact with the housing friction damper surface 28. The on-off binary damper 24 includes an electromagnetic coil core 30 and a magnetic locking slide 32 with the electromagnetic coil core 30 disposed proximate said magnetic locking slide 32 with a slide gap 34 between the electromagnetic coil core 30 and the magnetic locking slide 32 to provide for undamped relative sliding motion between the electromagnetic coil core 30 and said magnetic locking slide 32. The slide gap 34 between the core 30 and the locking slide 32 allows undamped relative sliding motion between the frame 22 and the tub 23 that is nonproblematic motion, particularly high frequency low amplitude relative motion which is not to be damped by the friction pad 26 contact with the damper surface 28. The slide gap 34 allows undamped relative sliding motion wherein a current supplied to the electromagnetic coil core 30 removes the slide gap 34 and electromagnetically locks the electromagnetic coil core 30 and the magnetic locking slide 32 together with the relative sliding motion transferred to the friction pad 26, with the friction pad 26 rubbing against the housing friction damper surface 28 inorder to dampen the problematic movement between the frame 22 and the rotating tub 23. With the on-off binary damper 24 having the electric current switchable magnetic locking slide 32 and electromagnetic coil core 30 in series with the friction pad 26, the binary damper 24 in the off state provides decoupling between the frame and tub for acceptable relative motion, and the binary damper 24 in the on state couples problematic unacceptable relative motion through the friction pad 26 so it is inhibited. The in series friction pad damper/switchable locking slide member bi-state damper system 24 switches from a relatively no damping state for high vibration isolation to a high level damping state through resonance. In the decoupled off state motion is taken up by the slide gap 34 with preferably no motion occurring between the passive damping friction pad 26 and the housing surface 28. In the coupled on state current energizes the magnetic coil core 30 removing the slide gap 34 from the magnetic locking slide such that the friction pad damper is coupled into the system with relative motion taking place in the damper between the friction pad 26 and the housing friction damper surface 28. Preferably the damper friction pads 26 are comprised of a nonmagnetic lubricated spongy resilient member, most preferably a greased foam sponge. Preferably the magnetic locking slide 32 is comprised of at least one flexible metal slat 36, preferably a plurality of slats 36, which are electromagnetically drawn inward towards the coil core 30 and magnetically locked in place, with the locking of the slide 32 transferring motion to its in series damper friction pad 26. Preferably the friction pad and damper housing rub only when a locking current is supplied to the coil core 30, with no current supplied no relative motion of the friction pad and damper surface occurs. The locking current supplied to the electromagnetic coil core 30 produces a magnetic field that locks the relative position of the slide 32 and coil core 30, inhibits sliding by removing the gap 34, and locks the surface of the flexible metal slide slats 36 and core together. Preferably the washer damper system controller supplies a steady locking current or no current at all, preferably with no varying of current or magnetic field, such that the surfaces are locked or unlocked and no varying friction between the slider surfaces. With the current to the coil core 30 off or on with not variability, the binary slider magnetic switchable member is in an unengaged off state or a locked engagement on state, with the mechanically coupled in series damper friction pad damping relative motion only when the locking current is supplied, and with no current supplied no relative motion of the decoupled friction pad. Current supplied to the electromagnetic coil core 30 produces a magnetic field that locks the relative position of the magnetic switchable slide member and the coil core by removing the slide gap 34 to inhibit sliding and locks the surface of slide slats and core together. Preferably the controller supplies a steady current for the on state or no current at all with the current off or on with not variability, so the surfaces forming the slide gap 34 are locked or unlocked and no varying friction between such that the slider is binary in that it is unengaged or in locked engagement. FIG. 3 shows a piston subassembly that has been removed from the outer tubular housing of damper 24. FIG. 3B illustrates that when no current is supplied to the coil core the magnetic switchable slide coupler/decoupler member provides a decoupled stroke of the motion input shaft 25, with the shaft 25 moving but the friction pad dampers 26 decoupled and stationary. FIG. 3C illustrates that when a locking current of 0.3 amps is supplied to the coil core the magnetic switchable slide coupler/decoupler member provides a coupled stroke of the input shaft 25 with the friction pad dampers 26. In FIG. 3B acceptable motion is accommodated within the magnetic locking slide in the piston with the electromagnetic coil core not energized, such as allowing for example an acceptable high frequency low amplitude motion with shaft 25 having a maximum decoupled stoke of about 24 mm. In FIG. 3C energizing the electromagnetic coil core couples the shaft 25 with the friction pad dampers 26 inorder to dampen an problematic motion, such as damping high amplitude motions with the maximum damped coupled stroke of about 80 mm. FIG. 4 shows an embodiment of the electromagnetic coil core 30 around which the wire coil is wrapped. Preferably the electromagnetic coil core 30 is magnetically permeable, and most preferably formed from a high permeability metal, such as a low carbon steel. The surface of the core under the coil wire is preferably coated with an electrically insulating coating layer prior to the wire being coiled around the core. FIG. 5 shows an embodiment of magnetically permeable slats 36 which encompass the core 30 to provide the magnetic locking slide 32. Magnetically permeable slats 36 are preferably metal slats, preferably formed from a high permeability low carbon steel, with the metal slats 36 shown in FIG. 5 comprising quarter sections of a cylindrical tube. FIG. 6 shows an embodiment of a magnetic locking slide housing 38, preferably comprised of a tubular member for containing and encompassing the metal slats 36 around the core 30. Preferably magnetic locking slide housing 38 is formed from a nonmagnetic plastic. FIG. 7 shows an embodiment of a magnetic locking slide housing first end bearing 40 for the shaft end of magnetic locking slide 32 distal from and separate from the friction pads 26. Magnetic locking slide housing first end bearing 40 preferably includes spring fingers 44 that maintain the slide gap 34 between the slats 36 and coil core 30 and keep the slats 36 from dragging in the off state. Preferably magnetic locking slide housing first end bearing 40 is formed from a nonmagnetic plastic. FIG. 8 shows an embodiment of a magnetic locking slide housing second end bearing 42 for the end of magnetic locking slide 32 proximate the friction damper pads 26. Magnetic locking slide housing second end bearing 42 preferably includes integral spring fingers 44 that maintain the slide gap 34 between the slats 36 and coil core 30 and keep the slats 36 from dragging in the off state. As shown in the embodiment of FIG. 8 the magnetic locking slide housing second end bearing 42 includes retaining housing grooves for retaining friction pads 26, such that the motion of shaft 25 is transferred to the damper pads 26 when the slats 36 are magnetically locked with the energized coil core 30. Spring finger resilient members 44 provide a flexible restorative spring force to urge the slats away from the coil core 30 and towards the housing 38 surrounding the slats 36, such that when the coil core is not energized the slide gap 34 decouples the motion of shaft 25 from the damper pads 26. Preferably magnetic locking slide housing second end bearing 42 is formed from a nonmagnetic plastic. FIG. 9 shows an embodiment of the damper pads 26, which preferably is a foam ring friction element, preferably made from a polyurethane foam. Preferably the magnetic switchable locking slide member is comprised of a plurality of metal slats 36. In preferred embodiments the metal slats 36 have a curved inner surface corresponding with a coil core having a curved outer surface for engaging the slat curved surface. In an alternative preferred embodiment, such as shown in FIG. 10, the metal slats 36 are flat metal slats and the coil core 30 has a flat polygonal perimeter corresponding with the slat flat surface, preferably with the cross section perimeter of the core rectangular, most preferably square. As shown in FIG. 10 the flat slats 36 are contained in an inner magnetic locking slide housing 46 having flat inside surfaces, and an outer magnetic locking slide housing 48. Preferably the magnetic locking slide metal slats 36 are independent from the magnetic locking slide housing containing them, preferably with the slats being independent metal members flexibly contained inside the magnetic locking slide housing. Preferably the magnetic locking slide slats 36 are independent from the magnetic locking slide housing containing them in that the slats are formed from a magnetic metal material and the magnetic locking slide housing containing them is formed from a nonmagnetic material. In a preferred embodiment the magnetic locking slide housing is formed from a nonmagnetic plastic. Preferably the slats 36 are independent from the magnetic locking slide housing containing them in that the slats 36 are not slotted fingers cut out from the housing with slots. Preferably the magnetic locking slide plastic housing containing the slats 36 is disposed between the magnetic locking slide metal slats 36 and the housing friction damper surface 28. Preferably the damper system includes a resilient member for providing a restorative spring force. In preferred embodiments the spring finger resilient members 44 provide a restorative spring force to bias the slats 36 away from the coil core 30 when not energized. In preferred embodiments the spring finger resilient members 44 provide a restorative spring force to bias the slats 36 away from the coil core 30 when not energized. As shown in FIG. 2B a first and second coil spring provide a restorative spring force to bias the coil core 30 in the longitudinal middle of the magnetic locking slides axial stroke, in comparison with FIG. 11 and FIG. 12 which do not include such coil springs proximate the coil core 30 for biasing the longitudinal position of the coil core 30 relative to the magnetic locking slides. As shown in a comparison between FIG. 11 and FIG. 12, the damper system of FIG. 11 includes an axial coil spring resilient member that provides a restorative spring force that bias the friction pads towards the input shaft 25 end of the damper.

Figure 13A:
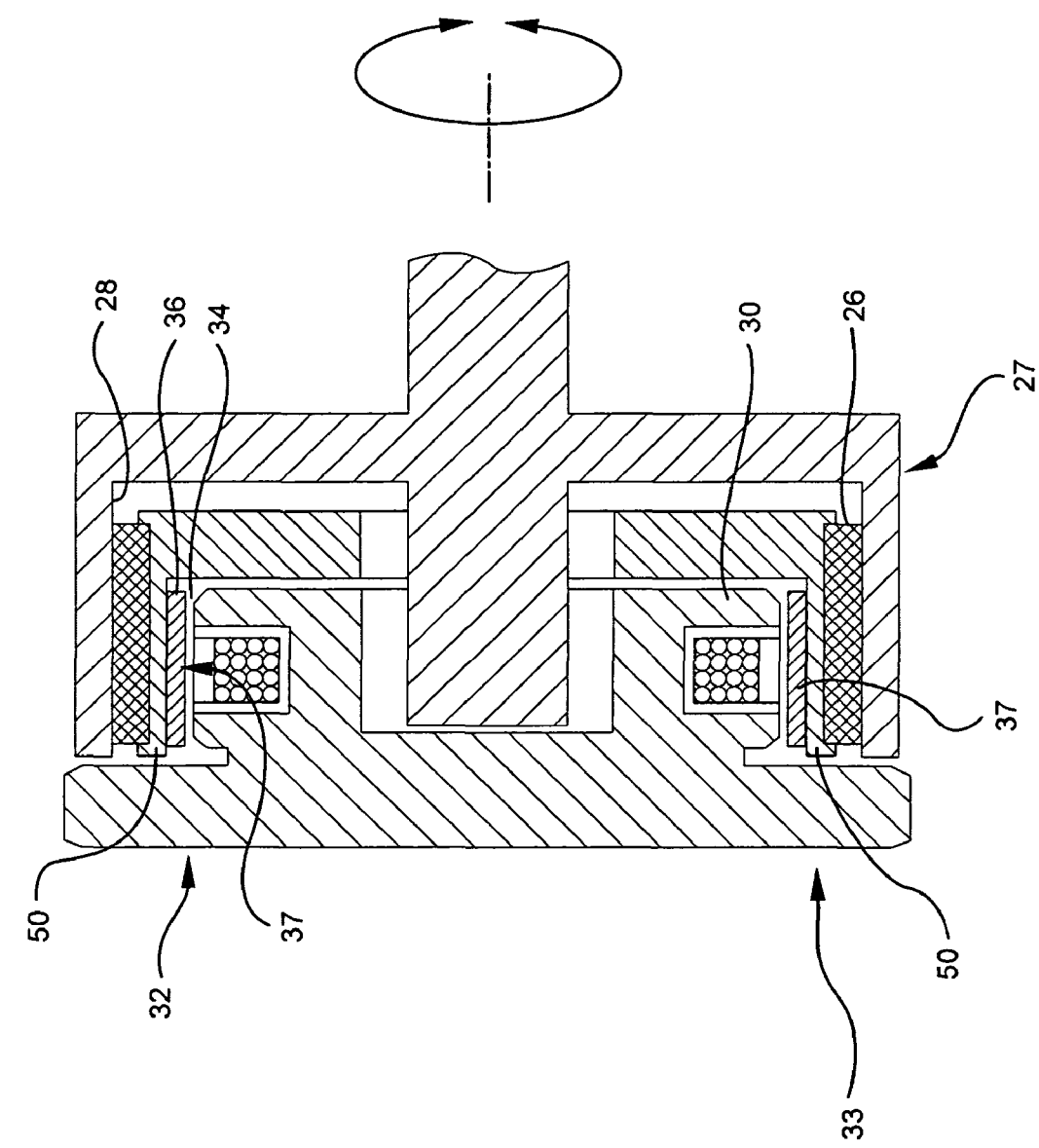
FIGS. 13A-D show embodiments of the invention.
Figure 13B:
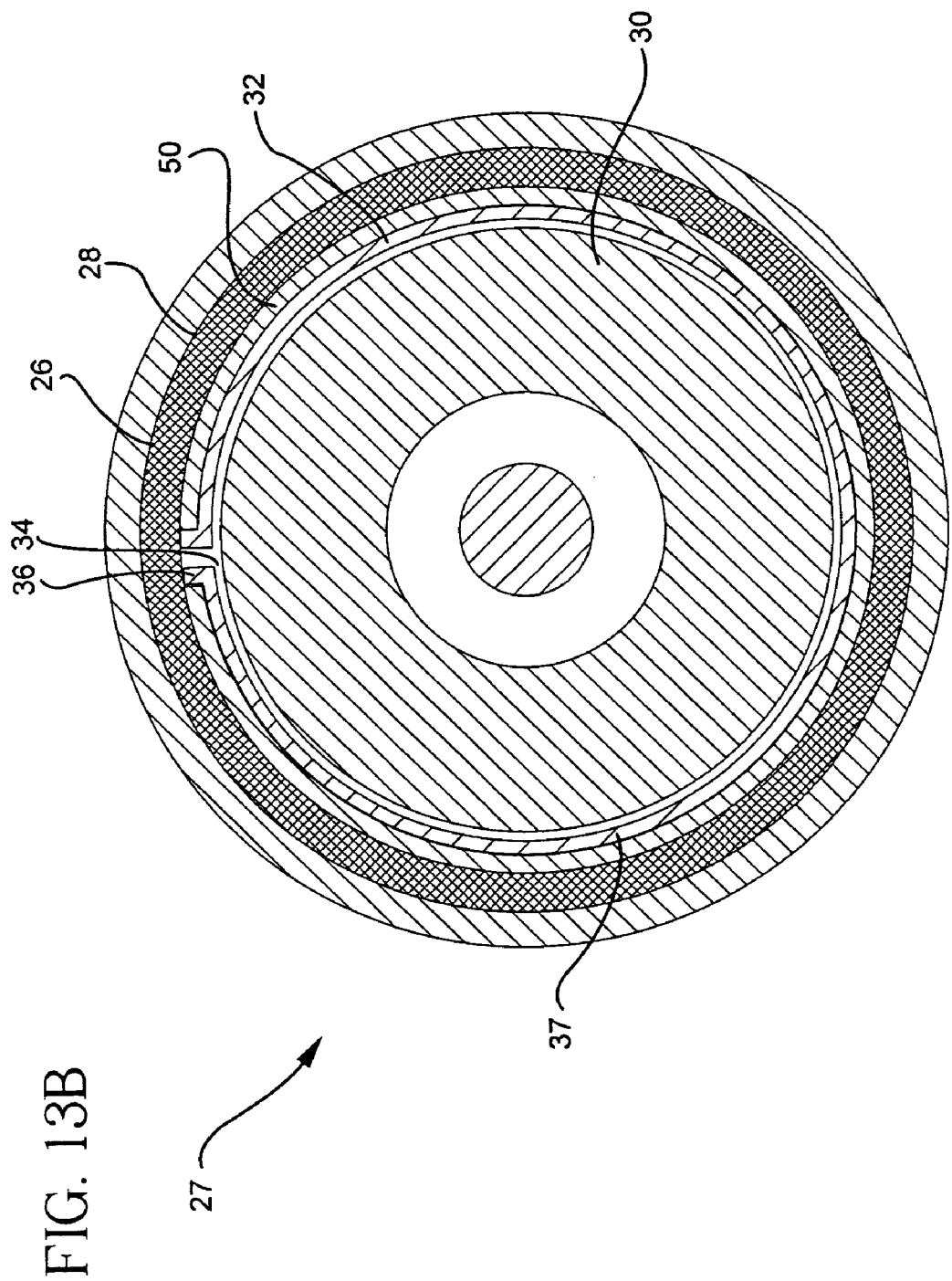
Figure 13C:
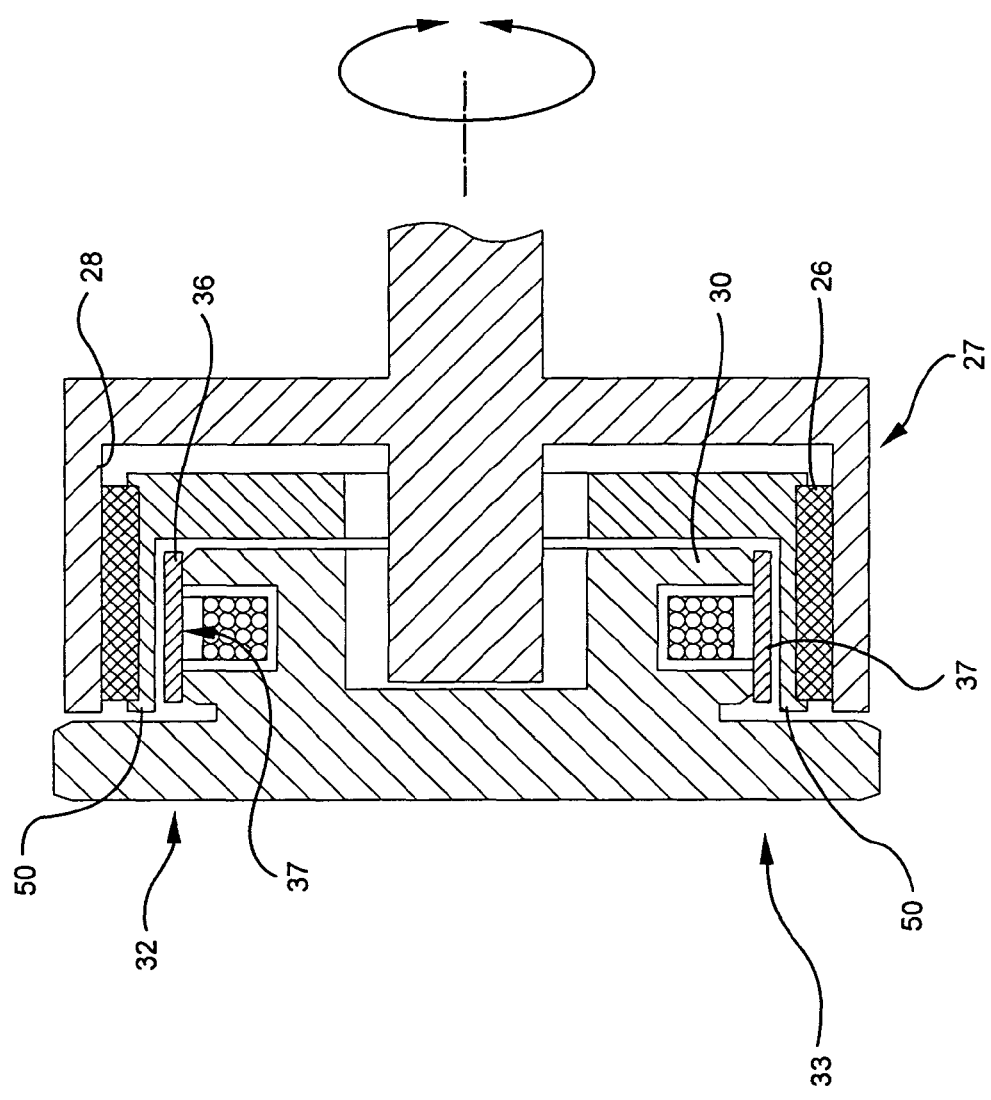
Figure 13D:
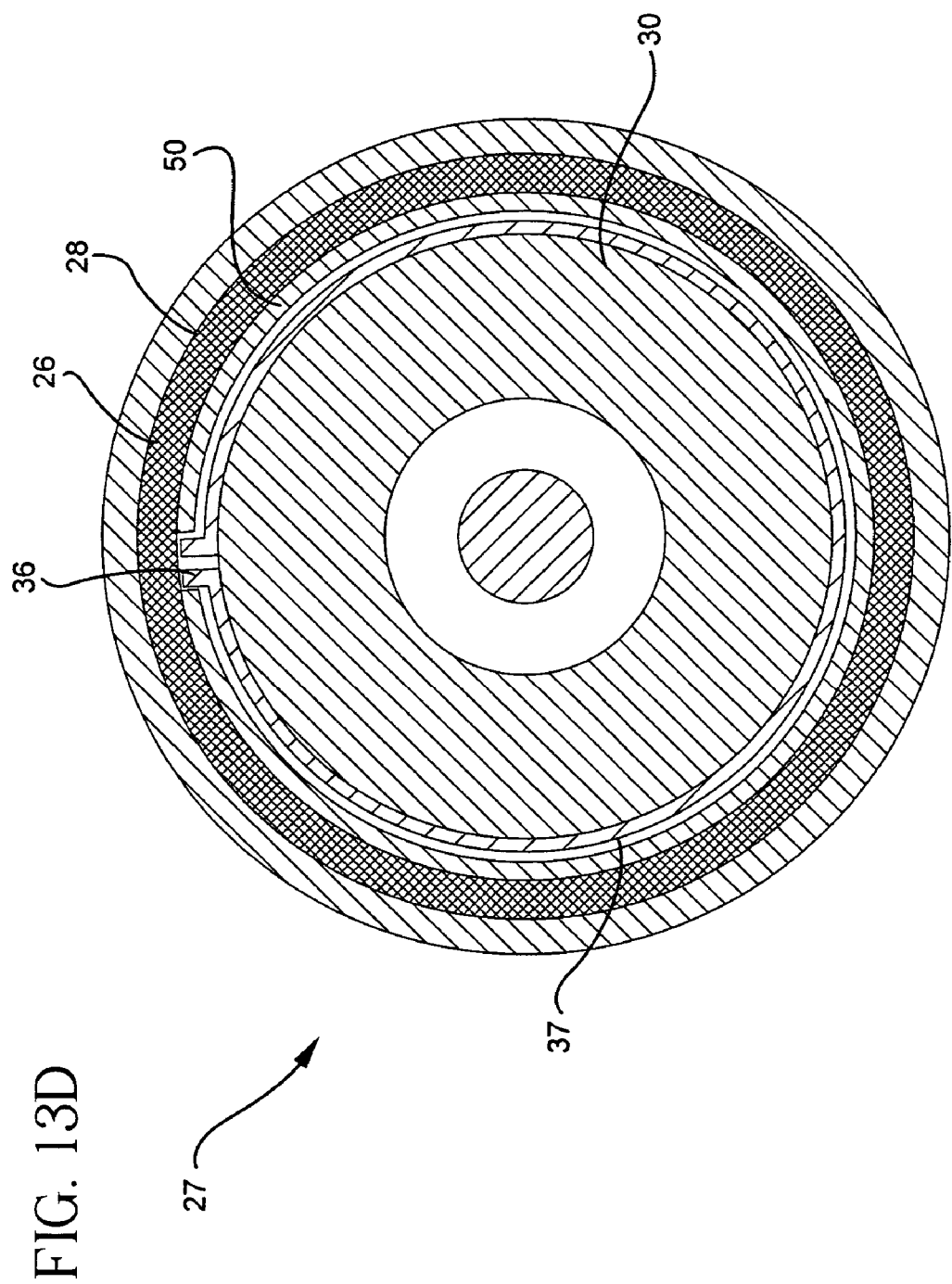

The invention includes an on-off binary damper system 24 for damping a problematic vibration. Preferably the on-off binary damper system 24 is a rotating tub washer on-off binary damper system for damping a temporal resonance problematic vibration during the operation of the variable rotating speed washer 20. The on-off binary damper system 24 includes a friction pad 26 and a housing friction damper surface 28, with the friction pad 26 in contact with the housing friction damper surface 28. Preferably the at least one friction pad 26 is a nonmagnetic lubricated spongy resilient member, most preferably a greased foam sponge friction ring sized such that it is precompressed between the housing friction damper surface 28 and its rigid retaining backing member during installation. The on-off binary damper system 24 includes an electromagnetic coil core 30 and a magnetic locking slide 32 that encompasses the electromagnetic coil core 30. The electromagnetic coil core 30 is preferably comprised of a magnetically permeable core onto which an insulated wire electrical conductor is wound. The electromagnetic coil core 30 is disposed proximate the magnetic locking slide 32 with a slide gap 34 between the electromagnetic coil core and the magnetic locking slide to provide for relative undamped sliding motion between the electromagnetic coil core 30 and the magnetic locking slide 32, wherein a current supplied to the electromagnetic coil core 30 removes the slide gap 34 and electromagnetically locks the electromagnetic coil core 30 and the magnetic locking slide 32 together with the relative sliding motion transferred to the at least one damper friction pad 26, with the damper friction pad 26 rubbing against the housing friction damper surface 28 inorder to dampen the problematic vibration. Preferably the magnetic locking slide 32 is comprised of at least one magnetically permeable metal slat, most preferably a plurality of magnetically permeable slats. In a preferred embodiment the magnetic locking slide magnetically permeable metal slats 36 are flat metal slats and the core 30 has a flat polygonal perimeter corresponding with the flat metal slats. Preferably the magnetic locking slide metal slats 36 are contained within a slat nonmagnetic housing, preferably a plastic magnetic locking slide housing. Preferably the plastic magnetic locking slide housing is comprised of a magnetic locking slide housing 46 disposed between the magnetic locking slide metal slats 36 and the housing friction damper surface 28. Preferably the damper system includes a resilient member for providing a restorative spring force. In preferred embodiments the spring finger resilient members 44 provide a restorative spring force to bias the slats 36 away from the coil core 30 when not energized. In preferred embodiments the spring finger resilient members 44 provide a restorative spring force to bias the slats 36 away from the coil core 30 when not energized. As shown in FIG. 2B a first and second coil spring provide a restorative spring force to bias the coil core 30 in the longitudinal middle of the magnetic locking slides axial stroke. As shown in a comparison between FIG. 11 and FIG. 12, the damper system of FIG. 11 includes an axial coil spring resilient member that provides a restorative spring force that bias the friction pads towards the input shaft 25 end of the damper. In a preferred alternative the at least one magnetically permeable metal slat 36 is comprised of a curved slat and said core 30 has a circular curved perimeter corresponding with the curved slat surface. As shown in the preferred rotary damper system embodiment in FIG. 13, the at least one magnetically permeable metal slat 36 is comprised of a curved band slat 36. In the rotary damper system shown in FIG. 13 the magnetically permeable metal curved band slat 36 encircles the grounded stationary electromagnetic coil core 30. As shown in the FIGS. 13A-B off state the slide gap 34 allows for the curved band slat 36 to rotate with its magnetic locking slide cup housing 50. In the FIGS. 13A-B off state with no current supplied to the stationary electromagnetic coil core 30 the curved band slat 36 rotates with a motion relative to the coil core 30. Damper friction pad 26 is fixed and attached to an outer surface magnetic locking slide cup housing 50. The damper friction pad 26 is preferably precompressed between the magnetic locking slide cup housing outer surface and the damper housing friction damper surface 28, preferably with the damper friction pad 26 is comprised of a nonmagnetic lubricated spongy resilient member, most preferably a greased foam sponge friction ring sized such that it is precompressed between the housing friction damper surface 28 and the magnetic locking slide cup housing 50. In the FIGS. 13A-B off state the slat 36, the cup housing 50, and the friction pad 26 rotate along with the input shaft and rotor and its acceptable rotating motion such that there is not relative motion between the friction pad 26 and the housing friction damper surface 28. To dampen an unacceptable rotating motion of the input shaft and rotor, a locking current is supplied to stationary electromagnetic coil core 30 which as shown in the FIGS. 13C-D on state removes the slide gap 34 between the curved band slat 36 and coil core 30 such that relative motion is transferred to the interface between the friction pad 26 and the housing friction damper surface 28, with the friction pad 26 damping the motion of the input shaft and rotor. The rotary on-off binary damper system 24 provides the rotary damper in series with the magnetic switchable rotary locking slide.

Figure 14:
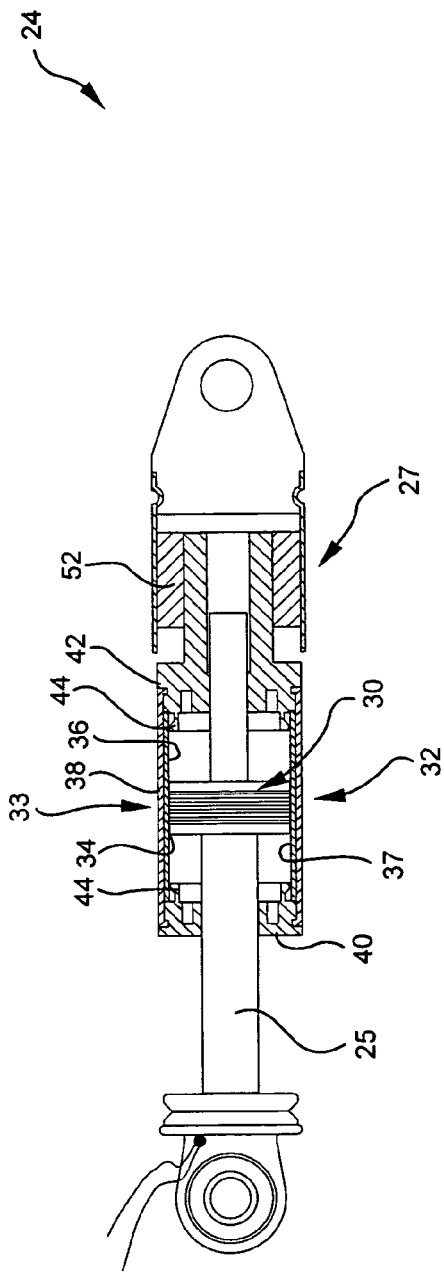
FIG. 14 shows an embodiment of the invention.
Figure 15:
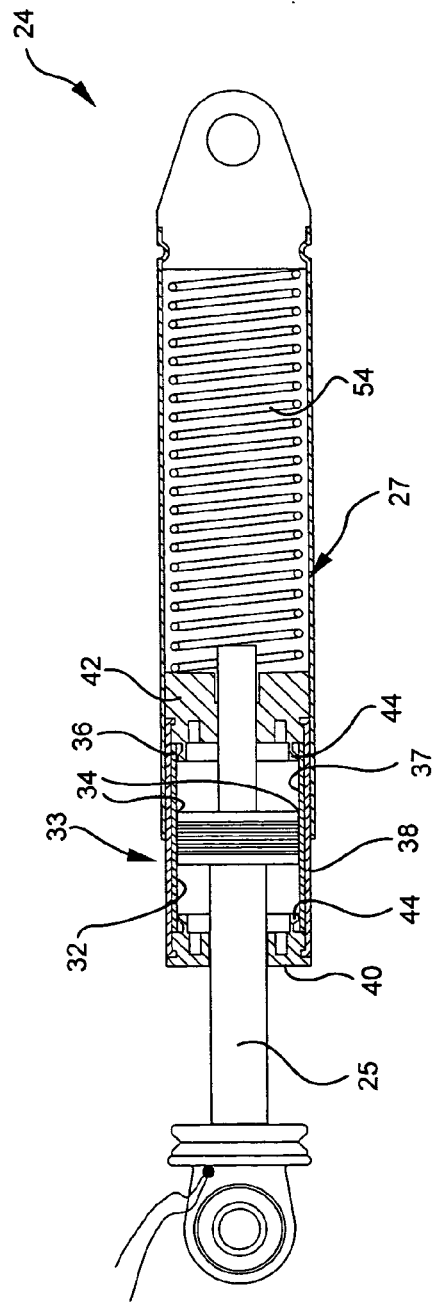
FIG. 15 shows an embodiment of the invention.

The invention includes an on-off binary damper system for damping a problematic vibration. The on-off binary damper system 24 provides for damping unacceptable temporal resonance motions. The on-off binary damper system 24 includes a damper 27 in series with a switchable electromagnetic coil core 30 and magnetic locking slide 32. The damper 27 is decouplably connected by the electromagnetic coil core 30 and magnetic locking slide 32 to the unacceptable motion that is to be dissipated and suppressed. The electromagnetic coil core 30 is disposed proximate the magnetic locking slide 32 with a slide gap 34 between the electromagnetic coil core 30 and the magnetic locking slide 32 to provide for undamped relative sliding motion between the electromagnetic coil core 30 and the magnetic locking slide 32, wherein a current supplied to the electromagnetic coil core 30 removes the slide gap 34 and electromagnetically locks the electromagnetic coil core 30 and the magnetic locking slide 32 together with the relative sliding motion transferred to the damper 27 with the damper 27 damping the problematic vibration. As shown in FIGS. 2,5,10-13 the magnetic locking slide 32 is comprised of at least one metal slat 36. Preferably the magnetic locking slide 32 is comprised of a plurality of metal slats 36. In preferred embodiments the magnetic locking slide metal slats 36 are flat metal slats 36 and the coil core 30 has a flat polygonal perimeter corresponding with the flat metal slats 36. In alternative preferred embodiments the magnetic locking slide metal slats 36 are curved metal slats 36. In a preferred embodiment for damping unacceptable rotary motions the magnetic locking slide 36 is a curved band slat and the coil core 30 has a circular perimeter corresponding with the curved band slat 36. Preferably the at least one metal slats 36 are contained within a nonmagnetic slide housing. The damper 27 is preferably a nonmagnetic passive damper. Preferably as shown in FIGS. 2,3,8,9,11-13, damper 27 comprises at least one friction pad 26 that engages a housing friction damper surface 28. Preferably the damper 27 is a friction damper. As shown in FIGS. 14-15 damper 27 comprises a resilient spring member nonfriction complex damper that includes damping and stiffness, with both real and imaginary components. As shown in FIG. 14 damper 27 is a bonded elastomeric resilient spring 52. As shown in FIG. 15 damper 27 is a resilient coil spring 54.

The invention includes a method of making an on-off binary damper system for damping a temporal resonance problematic vibration motion. The method of making a damper system 24 includes providing a damper 27 for dissipating and suppressing the unacceptable motion. The method includes providing a switchable magnetic locking slider 33. The magnetic locking slider 33 includes an electromagnetic coil core 30 and a magnetic locking slide 32, the electromagnetic coil core 30 disposed proximate the magnetic locking slide 32 with a slide gap 34 between the electromagnetic coil core 30 and the magnetic locking slide 32 to provide for an undamped relative sliding motion between the electromagnetic coil core 30 and the magnetic locking slide 32. The method includes coupling the damper 27 to the magnetic locking slider 33 wherein a current supplied to the electromagnetic coil core 30 removes the slide gap 34 and electromagnetically locks the electromagnetic coil core 30 and the magnetic locking slide 32 together with the relative sliding motion transferred to the damper 27 with the damper damping the problematic vibration motion. As shown in FIGS. 1-12, 14-15 in preferred embodiments for damping a linear reciprocating motion the provided switchable magnetic locking slider 33 is comprised of a linear slider with a slide gap 34 that provides for a relatively undamped linear sliding motion between the coil core 30 and magnetic locking slide slats 36. As shown in FIG. 13 in a preferred embodiment for damping an unacceptable rotating motion the provided switchable magnetic locking slider 33 is comprised of a rotary slider with a slide gap 34 that provides for a relatively undamped rotary motion between the coil core 30 and magnetic locking slide band slat 36.

The invention includes a method of damping a problematic vibration. The method includes providing a damper 27 and providing a magnetic locking slider 33. The provided magnetic locking slider 33 including an electromagnetic coil core 30 and a magnetic locking slide 32 with the electromagnetic coil core 30 disposed proximate the magnetic locking slide 32 with a slide gap 34 between the electromagnetic coil core 30 and the magnetic locking slide 32 to provide for undamped relative sliding motion between the electromagnetic coil core 30 and the magnetic locking slide 32. The method includes coupling the damper 27 to the magnetic locking slider 33, and supplying a current to the electromagnetic coil core 30 to remove the slide gap 34 and electromagnetically transfer the sliding motion to the damper 27 with the damper damping the problematic vibration. For damping problematic vibration linear reciprocating motions the provided switchable magnetic locking slider 33 is a linear slider with a slide gap 34 that provides for a relatively undamped linear sliding motion between the coil core 30 and magnetic locking slide slats 36 as shown in FIGS. 1-12, 14-15. For damping problematic vibration rotary motions the provided switchable magnetic locking slider 33 is a rotary slider as shown in FIG. 13 with a slide gap 34 that provides for a relatively undamped rotary motion between the coil core 30 and magnetic locking slide band slat 36.

The invention includes a method of making an on-off binary damper system 24 for damping a temporal resonance problematic vibration motion. The method includes providing a damper 27 and providing a separate magnetic switchable locking slider member 33. Preferably the damper 27 is a nonmagnetic damper. The magnetic switchable locking slider member 33 is provided for serial connection with the nonmagnetic damper 27. Magnetic switchable member 33 includes an electromagnetic coil core 30 and a magnetic target 37. The magnetic target 37 is preferably the at least one magnetically permeable metal slats 36. The electromagnetic coil core 30 is disposed proximate said magnetic target 37 with an uncoupling slide gap 34 between the electromagnetic coil core 30 and said magnetic target 37 to provide for relatively undamped uncoupled motion between the electromagnetic coil core 30 and the magnetic target 37. The nonmagnetic damper 27 is preferably disconnected and separated from the magnetic switchable member's electromagnetic coil core 30 by the uncoupling slide gap 34. The method includes serially coupling the nonmagnetic damper 27 with the separate magnetic switchable member 33 wherein a current supplied to said electromagnetic coil core 30 removes the relative uncoupled motion and the gap 34 between the electromagnetic coil core 30 and the magnetic target 37 and electromagnetically transfers the problematic motion to the nonmagnetic damper 27 with said nonmagnetic damper damping the problematic motion. For damping linear reciprocating motions the provided magnetic switchable locking slider member 33 is a linear slider with a slide gap 34 that provides for a relatively undamped linear sliding motion between the coil core 30 and magnetic target 37 as shown in FIGS. 1-12, 14-15. For damping rotary motions the provided magnetic switchable locking slider member 33 is a rotary slider as shown in FIG. 13 with a slide gap 34 that provides for a relatively undamped rotary motion between the coil core 30 and the magnetic target 37.

The invention includes a method of damping a problematic vibration motion. The method providing a nonmagnetic damper 27 and providing a magnetic switchable member 33 having an electromagnetic coil core 30 and a magnetic target 37, with the electromagnetic coil core 30 disposed proximate the magnetic target 37 with a decoupling slide gap 34 between the electromagnetic coil core and the magnetic target to provide for a relative uncoupled motion between the electromagnetic coil core and said magnetic target. The electromagnetic coil core of the magnetic switchable member 33 is separated and disconnected from the nonmagnetic damper 27. The method includes mechanically connecting and serially coupling the nonmagnetic damper 27 to the magnetic switchable member 33 and supplying a current to the electromagnetic coil core 30 to remove the relative uncoupled motion between said electromagnetic coil core 30 and the magnetic target 37 wherein the relative uncoupled motion is transferred to the nonmagnetic damper 27 with the damper damping the problematic motion.

The invention utilizes the electromagnetic mechanical switch magnelok coupler/decoupler member 33 in series with the passive damper 27. When the electromagnetic mechanical switch is not energized, the passive damping element 27 will be totally decoupled such that no damping occurs. Preferably in the off-state all system motion is taken up by the electromagnetic mechanical switch member 33 with no motion occurring in the passive damping member 27. When the electromagnetic mechanical switch is energized it locks such that the passive damping element is fully coupled into the system and all motion takes place in this damping element 27. The passive damper 27 preferably utilizes friction pads 26, and most preferably is a greased-sponge damper that provides for a durable and long-lived damping in the washing machine application. In the preferred embodiment the in series electromagnetic mechanical switch member 33 and greased-sponge damper 27 are located coaxially in the same assembly.

In the preferred embodiment the electromagnetic mechanical switch member 33 has but a single coil core 30 and makes extensive use of plastic components.

The electromechanical switch 33 in series with the durability, robustness and long life of greased-sponge passive damper 27 enables controlled damping that can be applied to the rotating tub washer suspension only when it is required. When damping is not helpful, the damper system allows virtually all damping to be removed from the system. Preferably the inventive damper system is utilized in a rotating tub washer 20 that includes sensors to determine the weight of the wash load in the rotating tub. Preferably the off-state of damper system 24 provides high vibration isolation when the washer tub is spinning at high RPM.

Figure 2A:
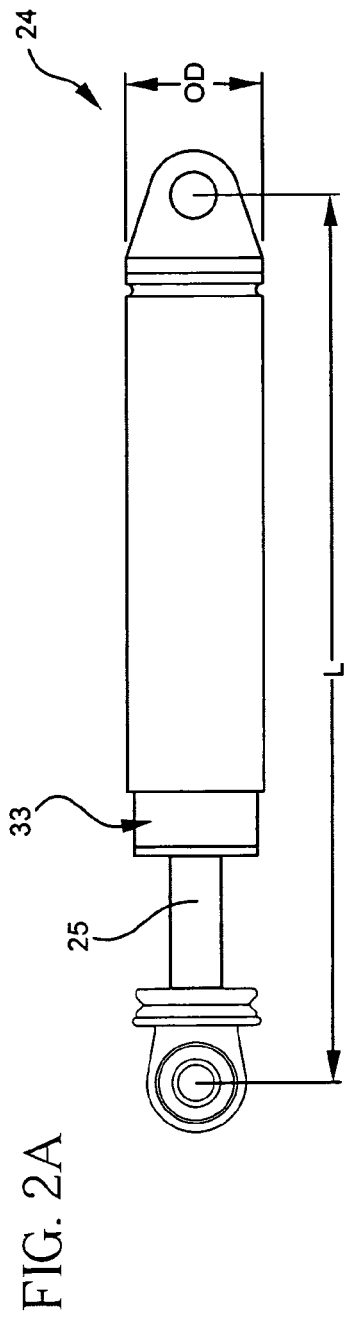
FIGS. 2A-C show embodiments of the invention.
Figure 2B:
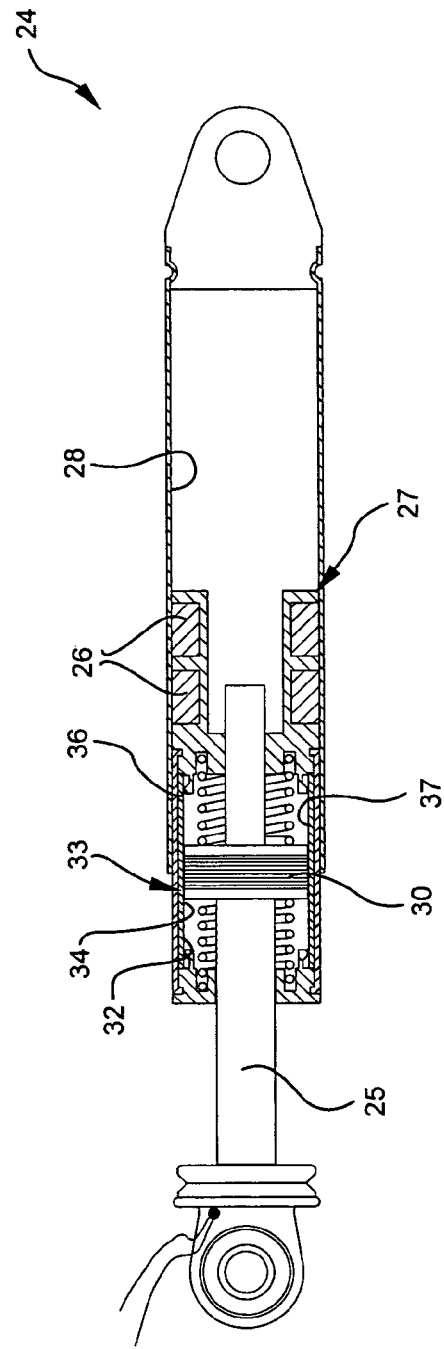

FIG. 2A shows an external view of the controlled damper 24. In this view only the input shaft 25 end of the piston that contains the electromagnetic mechanical switch coupler/decoupler element and the friction elements can be seen.

FIG. 2B shows a cross section view of the controlled damper 24. In this damper the shaft 25 is rigidly connected to the magnetic core coil assembly 30 shown in FIG. 4. This coil core 30 is surrounded by the magnetically permeable slats 36. In the embodiment shown in FIG. 5 there are four slats 36 made from magnetically permeable, low carbon steel, the slats 36 curved to match the outer circumference of the coil core 30. In this embodiment each slat 36 describes 90 degrees of a circular arc. Slats 36 are preferably contained inside a plastic housing 38 such as shown in FIG. 6 which allows the slats 36 to move radially by a small amount while constraining their longitudinal motion. Each end of the housing 38 is preferably closed with a bearing elements such as bearings 40 and 42 shown in FIGS. 7 and 8 that serve to guide the piston. Preferably the bearing elements also contain integral spring fingers 44. The spring fingers 44 serve to hold the slats 36 away from the coil core 30 when the coil is not energized thus ensuring that the off-state friction is very close to zero. When the coil core 30 is energized the slats are strongly attracted to the core by a magnetic attractive force. Friction between the slats 36 and the core 30 locks their assembly together such that motion of the input shaft 25 will now cause the entire housing to move axially. The distal shaft bottom end of the housing assembly (end distal from input shaft 25) is formed by the bottom second bearing 42. The bearing 42 also contains grooves that hold the greased sponge friction foam rings 26 as shown in FIGS. 8-9. These rings 26 are preferably formed from a strip of polyurethane foam that is curved to form a donut shape. The ends of the strip may be glued together. The polyurethane foam is lubricated with grease. The thickness of the foam rings 26 is such that they are compressed against damper surface 28 when the piston assembly is placed into the primary tubular steel housing. The frictional force required to move the piston assembly inside the primary tubular housing is controlled by the viscous properties of the grease, the radial stiffness of the foam rings and the amount of radial compression of the foam rings.

Figure 2C:
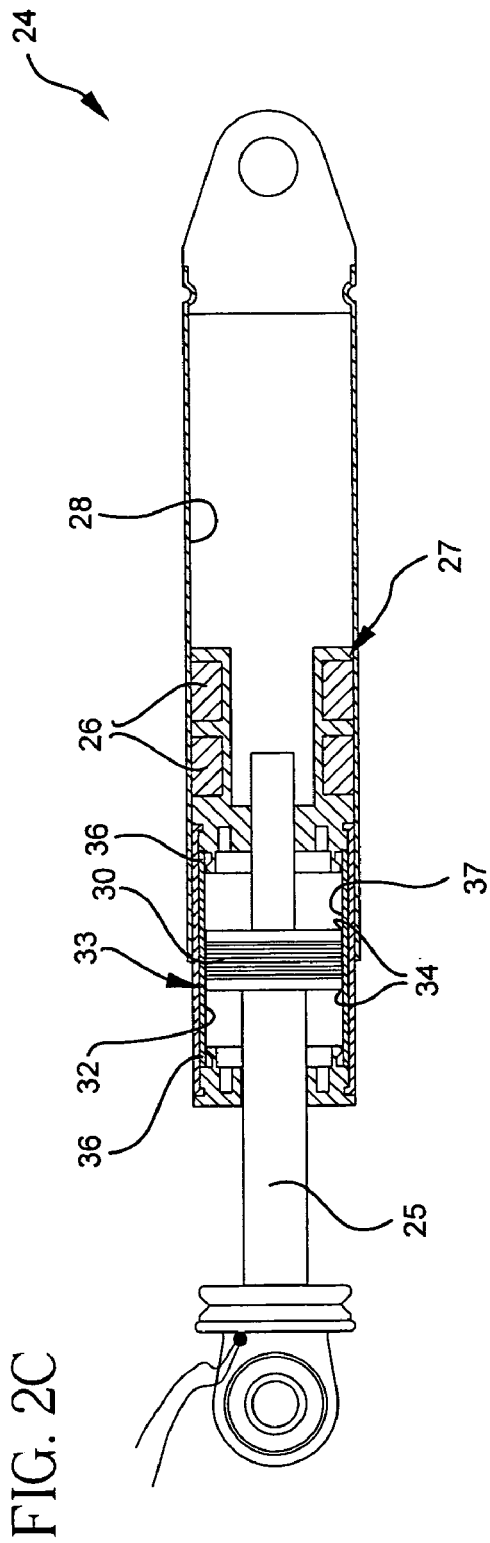

Also included in the embodiment of the invention shown in FIG. 2B is a pair of centering coil springs. These springs are preferably included to maintain the coil core 30 in the center of the housing 38 and to avoid having the coil core 30 bump into the bearings 40,42. Such springs add a small amount of stiffness to the off-state condition of the damper. Such springs are optional and may be eliminated as shown in FIG. 2C.

FIG. 3 shows a complete piston subassembly that has been removed from the primary tubular steel housing having damper surface 28. FIG. 3 illustrate how the electromagnetic mechanical switch magnelok coupler/decoupler member 33 serves to couple or decouple the friction elements 26. In FIG. 3B the coil core 30 is not energized. In this case all motion is taken up by the coil core 30 moving inside the slats and housing. When the coil is energized as shown in FIG. 3C, the electromagnetic mechanical switch magnelok coupler/decoupler member 33 is locked such that the entire piston subassembly moves as a unit and the greased foam rings 26 are forced to slide inside the primary tubular steel housing against damper surface 28.

FIG. 1 shows a pair of dampers 24 mounted in front load washer 20. The electromagnetic coil cores are energized when it is desired to have high damping such as when the speed of the machine is passing through a resonance. The electromagnetic mechanical switch coupler/decoupler member 33 are disengaged (no current supplied) when it is desired to have minimum damping such as during a-high speed spin condition when a very high level of vibration isolation is desired for quiet operation or when the clothes are being loaded into the machine and the deflection of the tub support springs is used to determine (weigh) the size of the wash load.

EXAMPLE

A damper system 24 as shown in FIG. 2C without the centering springs was made with the friction pad sponge rings 26 made from a high strength ether-based polyurethane foam that was a mixture of closed and open cells. The foam had a firmness rating of 8 and is rated at 65 PSI at 25% deflection in compression. It had a density of 30 pounds per cubic foot and a tensile strength of 705 PSI. The rings were formed from strips of foam 6.5 mm thick. The overall dimension of the damper 24 as shown in FIG. 2A had a damper length L between eye center ends of a max of 275 mm and min of 190 mm with the OD 32 mm. The polyurethane foam was lubricated with a synthetic plastic on steel lubricating grease (such as Kluber Lubrication (Polylub GLY 801). It is has a rating of NLGI 1 and uses a very high viscosity base oil (730 cSt at 40 C).

Electrical details of the electromagnetic coil core 30 were:

| | |
|---|---|
| Coil winding: | 900 turns of 34 AWG magnet wire |
| Coil resistance: | 60 ohms |
| Maximum current: | 0.3 amps |
| Maximum voltage: | 12 volts |

Figure 16:
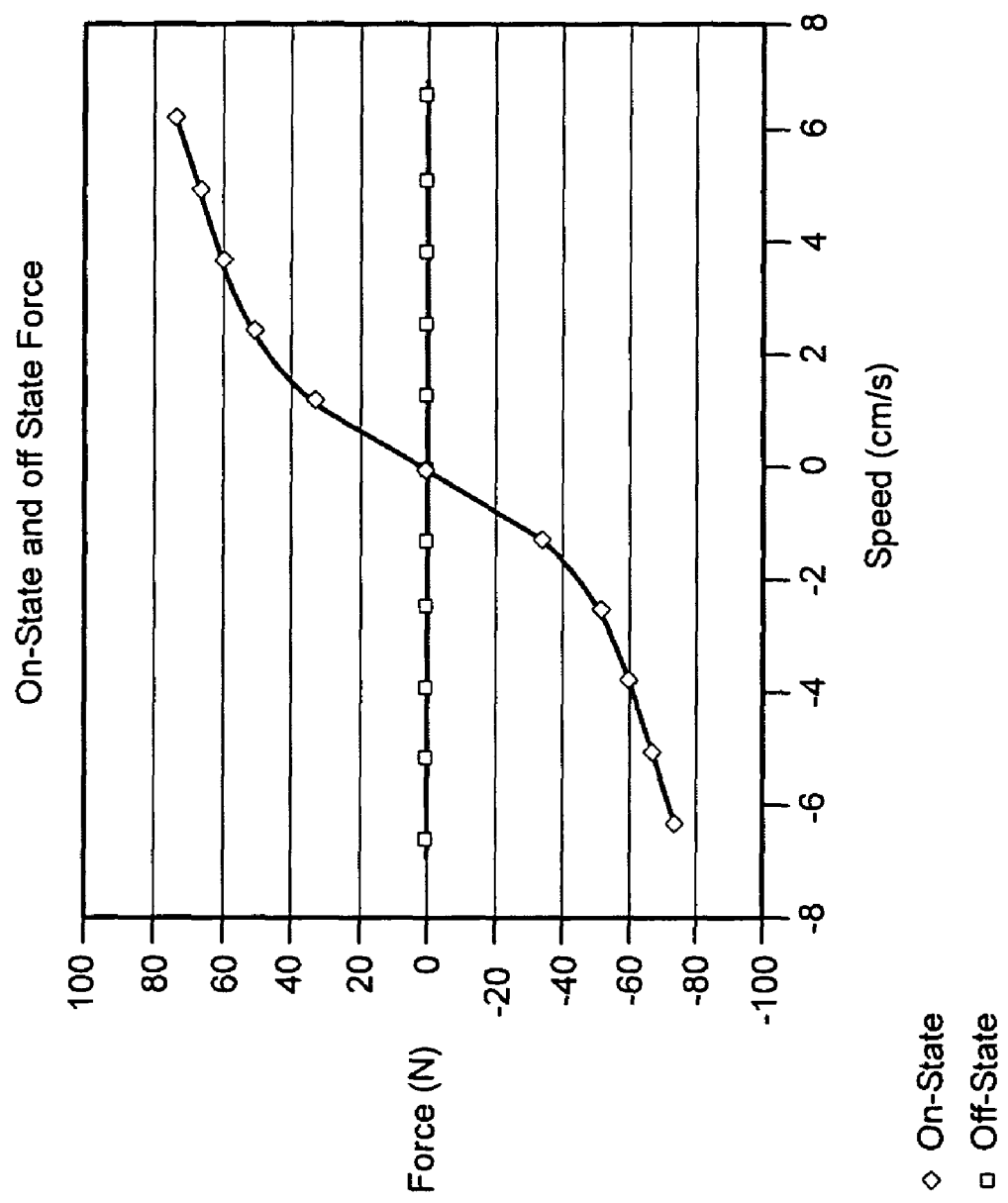
FIG. 16 is a plot of Force (y-axis) and Speed (x-axis) for the on state and off state of an on-off binary damper embodiment of the invention.

Measured performance of the damper is shown in the graph in FIG. 16. In the off-state with no current to the coil the damping force is essentially zero. With 0.3 amps applied, the electromagnetic mechanical switch coupler/decoupler member 33 locks and the damper 27 greased polyurethane foam friction rings 26 are forced to slide inside the tubular steel housing against the damper surface 28 producing the damping force shown for the on-state.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A rotating tub washer, said washer comprised of a frame, a rotating tub, and an on-off binary damper system for damping a problematic movement between said frame and said rotating tub, said on-off binary damper system having a friction pad and a housing friction damper surface, said friction pad in contact with said housing friction damper surface, said on-off binary damper system having an electromagnetic coil core and a magnetic locking slide, said electromagnetic coil core disposed proximate said magnetic locking slide with a slide gap between said electromagnetic coil core and said magnetic locking slide to provide for relative sliding motion between said electromagnetic coil core and said magnetic locking slide, wherein a current supplied to said electromagnetic coil core removes said slide gap with a slide gap closing direction, said slide gap closing direction non-parallel with said relative sliding motion and electromagnetically locks the electromagnetic coil core and said magnetic locking slide together at any of a plurality of relative positions with said relative sliding motion transferred to said friction pad, with said friction pad rubbing against said housing friction damper surface in order to dampen said problematic movement between said frame and said rotating tub, and with said slide gap between said electromagnetic coil core and said magnetic locking slide said friction pad in contact with said housing friction damper surface does not rub against said housing friction damper surface.

2. A rotating tub washer as claimed in claim 1, wherein said magnetic locking slide is comprised of a plurality of metal slats.

3. A rotating tub washer as claimed in claim 2, wherein said magnetic locking slide metal slats are flat metal slats and said core has a flat polygonal perimeter corresponding with said flat metal slats.

4. A rotating tub washer as claimed in claim 2 wherein said magnetic locking slide metal slats are contained within a slat housing.

5. A rotating tub washer as claimed in claim 4 wherein said slat housing is disposed between said magnetic locking slide metal slats and said housing friction damper surface.

6. A rotating tub washer as claimed in claim 1, wherein said magnetic locking slide is comprised of at least one metal slat.

7. An on-off binary damper system for damping a problematic vibration, said on-off binary damper system having a friction pad and a housing friction damper surface, said friction pad in contact with said housing friction damper surface, said on-off binary damper system having an electromagnetic coil core and a magnetic locking slide, said electromagnetic coil core disposed proximate said magnetic locking slide with a slide gap between said electromagnetic coil core and said magnetic locking slide to provide for relative sliding motion between said electromagnetic coil core and said magnetic locking slide, wherein a current supplied to said electromagnetic coil core removes said slide gap with a slide gap closing direction, said slide gap closing direction non-parallel with said relative sliding motion and electromagnetically locks the electromagnetic coil core and said magnetic locking slide together at any of a plurality of relative positions with said relative sliding motion transferred to said friction pad, with said friction pad rubbing against said housing friction damper surface in order to dampen said problematic vibration.

8. A binary damper system as claimed in claim 7, wherein said magnetic locking slide is comprised of a plurality of metal slats.

9. A binary damper system as claimed in claim 8, wherein said magnetic locking slide metal slats are flat metal slats and said core has a flat polygonal perimeter corresponding with said flat metal slats.

10. A binary damper system as claimed in claim 8 wherein said magnetic locking slide metal slats are contained within a slat housing.

11. A binary damper system as claimed in claim 10 wherein said slat housing is disposed between said magnetic locking slide metal slats and said housing friction damper surface.

12. A binary damper system as claimed in claim 7, wherein said magnetic locking slide is comprised of at least one metal slat.

13. A binary damper system as claimed in claim 12, wherein said at least one metal slat is comprised of a curved band slat and said core has a circular perimeter corresponding with said curved band slat.

14. An on-off binary damper system for damping a problematic vibration, said on-off binary damper system having a damper, an electromagnetic coil core and a magnetic locking slide, said electromagnetic coil core disposed proximate said magnetic locking slide with a slide gap between said electromagnetic coil core and said magnetic locking slide to provide for relative sliding motion between said electromagnetic coil core and said magnetic locking slide, wherein a current supplied to said electromagnetic coil core removes said slide gap with a slide gap closing direction, said slide gap closing direction non-parallel with said relative sliding motion and electromagnetically locks the electromagnetic coil core and said magnetic locking slide together at any of a plurality of relative positions with said relative sliding motion transferred to said damper with said damper damping said problematic vibration.

15. A binary damper system as claimed in claim 14, wherein said magnetic locking slide is comprised of a plurality of metal slats.

16. A binary damper system as claimed in claim 15, wherein said magnetic locking slide metal slats are flat metal slats and said core has a flat polygonal perimeter corresponding with said flat metal slats.

17. A binary damper system as claimed in claim 15 wherein said magnetic locking slide metal slats are contained within a slat housing.

18. A binary damper system as claimed in claim 14, wherein said magnetic locking slide is comprised of at least one metal slat.

19. A binary damper system as claimed in claim 18, wherein said magnetic locking slide is comprised of a curved band slat and said core has a circular perimeter corresponding with said curved band slat.

20. A method of making a damper system for damping a problematic vibration, said method including: providing a friction damper, providing a magnetic locking slider, said magnetic locking slider having an electromagnetic coil core and a magnetic locking slide, said electromagnetic coil core disposed proximate said magnetic locking slide with a slide gap between said electromagnetic coil core and said magnetic locking slide to provide for a relative sliding motion between said electromagnetic coil core and said magnetic locking slide, and coupling said damper to said magnetic locking slider wherein a current supplied to said electromagnetic coil core removes said slide gap with a slide gap closing direction, said slide gap closing direction non-parallel with said relative sliding motion and electromagnetically locks the electromagnetic coil core and said magnetic locking slide together at any of a plurality of relative positions with said relative sliding motion transferred to said friction damper with said damper damping said problematic vibration.

* * * * *